US009154549B2

(12) United States Patent
Sundararaj

(10) Patent No.: US 9,154,549 B2
(45) Date of Patent: *Oct. 6, 2015

(54) DYNAMIC SERVER FARMS

(75) Inventor: Carthic Sundararaj, Tamil Nadu (IN)

(73) Assignee: Cisco Technology, Inc., San Jose, CA (US)

( * ) Notice: Subject to any disclaimer, the term of this patent is extended or adjusted under 35 U.S.C. 154(b) by 274 days.

This patent is subject to a terminal disclaimer.

(21) Appl. No.: 13/283,114

(22) Filed: Oct. 27, 2011

(65) Prior Publication Data

US 2013/0111467 A1    May 2, 2013

(51) Int. Cl.
*G06F 15/173* (2006.01)
*H04L 29/08* (2006.01)
*G06F 9/50* (2006.01)

(52) U.S. Cl.
CPC ............ *H04L 67/1002* (2013.01); *G06F 9/505* (2013.01); *G06F 2209/5011* (2013.01); *G06F 2209/5022* (2013.01)

(58) Field of Classification Search
None
See application file for complete search history.

(56) References Cited

U.S. PATENT DOCUMENTS

| 5,774,668 | A  | * | 6/1998  | Choquier et al. ............. 709/223 |
|-----------|----|---|---------|--------------------------------------|
| 6,185,619 | B1 | * | 2/2001  | Joffe et al. ................... 709/229 |
| 6,725,253 | B1 |   | 4/2004  | Okano et al. |
| 6,757,723 | B1 |   | 6/2004  | O'Toole et al. |
| 6,820,123 | B1 |   | 11/2004 | Gourlay |
| 6,920,506 | B2 |   | 7/2005  | Barnard et al. |
| 6,934,754 | B2 |   | 8/2005  | West et al. |
| 6,941,356 | B2 |   | 9/2005  | Meyerson |
| 6,944,653 | B2 |   | 9/2005  | Fong et al. |
| 6,944,785 | B2 | * | 9/2005  | Gadir et al. .................. 714/4.11 |
| 6,970,913 | B1 |   | 11/2005 | Albert et al. |
| 7,020,090 | B2 |   | 3/2006  | Chandwadkar et al. |
| 7,089,328 | B1 |   | 8/2006  | O'Rourke et al. |
| 7,127,720 | B2 |   | 10/2006 | Cano et al. |
| 7,131,140 | B1 |   | 10/2006 | O'Rourke et al. |
| 7,155,722 | B1 |   | 12/2006 | Hilla et al. |
| 7,191,235 | B1 |   | 3/2007  | O'Rourke et al. |
| 7,228,441 | B2 | * | 6/2007  | Fung ............................ 713/300 |
| 7,284,053 | B1 |   | 10/2007 | O'Rourke et al. |
| 7,305,429 | B2 |   | 12/2007 | Borella |
| 7,340,526 | B2 |   | 3/2008  | Kime et al. |
| 7,340,744 | B2 |   | 3/2008  | Chandwadkar et al. |
| 7,346,686 | B2 |   | 3/2008  | Albert et al. |
| 7,412,514 | B2 | * | 8/2008  | Shuster ........................ 709/226 |
| 7,415,523 | B2 |   | 8/2008  | O'Rourke et al. |

(Continued)

OTHER PUBLICATIONS

"Big-IP Enterprise Controller," copyright 2001, F5 Networks, Inc.

(Continued)

*Primary Examiner* — Jason K. Gee
*Assistant Examiner* — Olanrewaju Bucknor
(74) *Attorney, Agent, or Firm* — Edell, Shapiro & Finnan, LLC

(57) ABSTRACT

Techniques are provided for automatically adding/removing servers to/from a server farm in response to monitored load demands. A load among a plurality of servers, resulting from traffic associated with an application hosted on the plurality of servers is balanced. The load on the plurality of servers is monitored and it is determined that the load on the plurality of servers exceeds a predetermined load threshold. In response to such a determination, one or more additional servers are automatically provisioned for use in hosting the application. The load is then balanced between the plurality of servers and the one or more additional servers.

15 Claims, 7 Drawing Sheets

(56) References Cited

U.S. PATENT DOCUMENTS

| | | | |
|---|---|---|---|
| 7,472,178 B2 | 12/2008 | Lisiecki et al. | |
| 7,480,705 B2 * | 1/2009 | DeLima et al. | 709/222 |
| 7,624,169 B2 | 11/2009 | Lisiecki et al. | |
| 7,650,402 B1 | 1/2010 | Batz et al. | |
| 7,653,700 B1 | 1/2010 | Bahl et al. | |
| 7,694,011 B2 | 4/2010 | O'Rourke et al. | |
| 7,719,974 B2 | 5/2010 | Chandwadkar et al. | |
| 7,721,125 B2 * | 5/2010 | Fung | 713/320 |
| 7,734,807 B2 * | 6/2010 | Shuster | 709/232 |
| 7,738,452 B1 | 6/2010 | O'Rourke et al. | |
| 7,770,215 B2 | 8/2010 | O'Rourke et al. | |
| 7,822,967 B2 * | 10/2010 | Fung | 713/100 |
| 7,941,556 B2 | 5/2011 | Canali et al. | |
| 7,984,151 B1 | 7/2011 | Raz et al. | |
| 8,013,859 B2 | 9/2011 | Cannon, III | |
| 8,150,951 B2 | 4/2012 | O'Rourke et al. | |
| 8,156,199 B1 | 4/2012 | Hoche-Mong et al. | |
| 8,296,434 B1 | 10/2012 | Miller et al. | |
| 8,327,017 B1 | 12/2012 | Trost et al. | |
| 8,433,749 B2 * | 4/2013 | Wee et al. | 709/203 |
| 8,510,434 B2 | 8/2013 | Wang et al. | |
| 2003/0229697 A1 | 12/2003 | Borella | |
| 2004/0054780 A1 * | 3/2004 | Romero | 709/226 |
| 2004/0264481 A1 | 12/2004 | Darling et al. | |
| 2005/0172011 A1 | 8/2005 | Gourlay et al. | |
| 2006/0112170 A1 | 5/2006 | Sirkin | |
| 2006/0168164 A1 | 7/2006 | Lemson et al. | |
| 2006/0209688 A1 | 9/2006 | Tsuge et al. | |
| 2006/0230407 A1 | 10/2006 | Rosu et al. | |
| 2007/0011685 A1 | 1/2007 | Yim et al. | |
| 2007/0143454 A1 | 6/2007 | Ma et al. | |
| 2007/0174660 A1 | 7/2007 | Peddada | |
| 2007/0214282 A1 | 9/2007 | Sen | |
| 2007/0260654 A1 | 11/2007 | Creamer et al. | |
| 2008/0104608 A1 | 5/2008 | Hyser et al. | |
| 2008/0225718 A1 | 9/2008 | Raja et al. | |
| 2009/0094610 A1 | 4/2009 | Sukirya | |
| 2009/0172192 A1 | 7/2009 | Christian et al. | |
| 2009/0222562 A1 * | 9/2009 | Liu et al. | 709/226 |
| 2010/0005175 A1 * | 1/2010 | Swildens et al. | 709/226 |
| 2010/0036903 A1 | 2/2010 | Ahmad et al. | |
| 2010/0235441 A1 | 9/2010 | Christian et al. | |
| 2010/0268764 A1 * | 10/2010 | Wee et al. | 709/203 |
| 2010/0274890 A1 | 10/2010 | Patel et al. | |
| 2010/0299763 A1 * | 11/2010 | Marcus et al. | 726/30 |
| 2011/0072073 A1 | 3/2011 | Curtis | |
| 2011/0078303 A1 * | 3/2011 | Li et al. | 709/224 |
| 2011/0106949 A1 | 5/2011 | Patel et al. | |
| 2011/0126207 A1 * | 5/2011 | Wipfel et al. | 718/104 |
| 2011/0138384 A1 * | 6/2011 | Bozek et al. | 718/1 |
| 2011/0153827 A1 * | 6/2011 | Yengalasetti et al. | 709/226 |
| 2011/0153840 A1 * | 6/2011 | Narayana et al. | 709/227 |
| 2012/0017156 A1 | 1/2012 | Broda et al. | |
| 2012/0066371 A1 | 3/2012 | Patel et al. | |

OTHER PUBLICATIONS

William V. Wollman et al., "Plug and Play Server Load Balancing and Global Server Load Balancing for Tactical Networks," copyright 2003, The MITRE Corporation.

Apache HTTP Server Version 2.2, Apache Module mod_proxy_balancer, copyright 2011, The Apache Software Foundation.

Cisco Content Services Switch Content Load-Balancing Configuration Guide, Chapter 3, Configuring Services, Software Version 7.50, Mar. 2005.

Sun Microsystems, Inc., "Application Scalability & Fault Tolerance with Glassfish™ Load Balancer," White Paper, Apr. 2009, pp. 1-13.

* cited by examiner

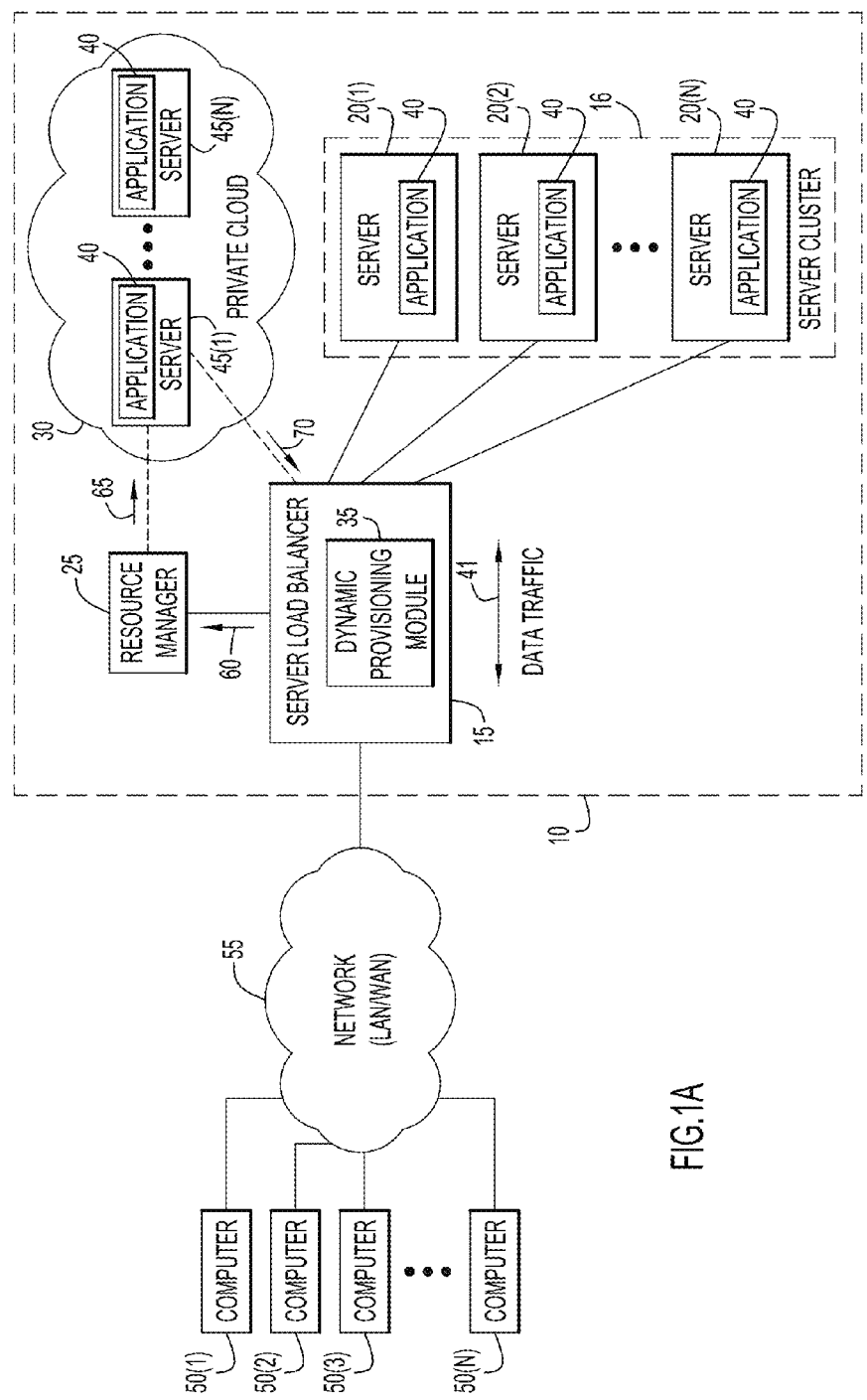

DYNAMIC SERVER FARMS

TECHNICAL FIELD

The present disclosure relates to server farms.

BACKGROUND

Due to increasing traffic in computer networks, such as the Internet and corporate intranets (e.g., corporate Wide Area Networks (WANs) and Local Area Networks (LANs)), data providers need to satisfy an increasing number of data requests. For example, a company that provides a search engine for the Internet may handle over a million hits (i.e., accesses to its web page) every day. In practice, a single server cannot handle such a large volume of data requests within an acceptable response time. Therefore, most high-volume information providers use a collection of multiple servers, commonly referred to as a server farm, to satisfy the large number of data requests. Access to these multiple servers is managed through load balancing.

Load balancing is a technique for spreading work (load) among the servers in the server farm. Load balancing generally improves resource utilization and decreases computing time and may be implemented in hardware, software, or a combination of hardware and software.

BRIEF DESCRIPTION OF THE DRAWINGS

FIG. 1A is a block diagram of an example computing enterprise having a server load balancer and resource manager configured for on-demand addition/removal of servers to/from a server farm.

DESCRIPTION OF EXAMPLE EMBODIMENTS

Overview

Figure 1B:
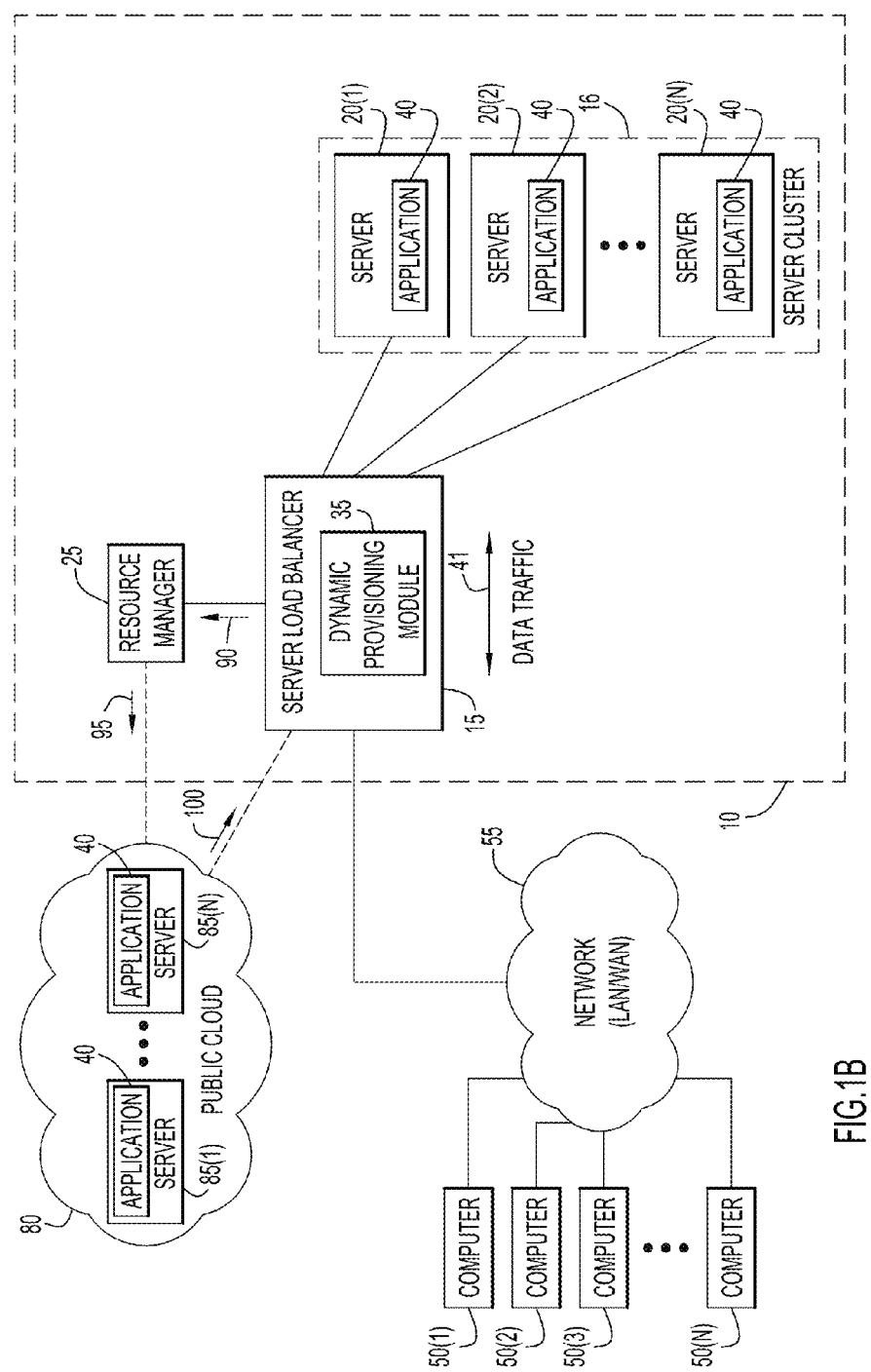
FIG. 1B is a block diagram of another example computing enterprise having a server load balancer and resource manager configured for on-demand addition/removal of servers to/from a server farm.

Techniques are provided for automatically adding/removing servers to/from a server farm in response to monitored load demands. A load among a plurality of servers, resulting from traffic associated with an application hosted on the plurality of servers is balanced. The load on the plurality of servers is monitored and it is determined that the load on the plurality of servers exceeds a predetermined load threshold. In response to such a determination, one or more additional servers are automatically provisioned for use in hosting the application. The load is then balanced between the plurality of servers and the one or more additional servers.

Example Embodiments

FIG. 1A is a block diagram of a computing enterprise 10 configured for on-demand addition/removal of servers. Computing enterprise 10 comprises a server load balancer (SLB) 15, a server farm 16 including a plurality of servers 20(1)-20(N), a resource manager 25, and a private cloud 30. Server load balancer 15 comprises a dynamic provisioning module 35 and servers 20(1)-20(N) each host separate instances of an application 40. Private cloud 30 comprises a plurality of servers 45(1)-45(N).

The instances of application 40 hosted on each of servers 20(1)-20(N) are configured to be accessed from one or more computers 50(1)-50(N) via a computer network 55. Computer network 55 may be, for example, the Internet or a corporate intranet (e.g., corporate Wide Area Network (WAN) or Local Area Networks (LAN)). Application 40 may comprise, for example, a hosted webpage.

Each access to an instance of application 40 on one of servers 20(1)-20(N) results in a connection between the application instance and the requesting computer, and thereby places a load on the server hosting the accessed instance. That is, each connection will utilize processing, memory, and/or other resources of the respective server. Each of servers 20(1)-20(N) include limited amounts of these resources and, as such, each server can only support a limited load (number of connections) at any one time. The connections between computers 50(1)-50(N) and instances of application 40 are collectively referred to herein as data traffic 41. Data traffic 41 is schematically shown in FIG. 1A at arrow 41.

Server load balancer 15 is provided to ensure that the load placed on each of servers 20(1)-20(N) as a result of data traffic 41 remains below acceptable threshold levels. More specifically, load balancer 15 is configured to balance the load (connections) between servers 20(1)-20(N) in accordance with one or more load balancing methods or strategies. There are many strategies that may be used to balance loads between the servers 20(1)-20(N). One such strategy is the round robin strategy in which server load balancer 15 sequentially allocates connections to each of the servers 20(1)-20(N) in accordance with a predetermined rotation. Another strategy is a least number of connections strategy in which server load balancer 15 tracks the number of connections to each of the servers 20(1)-20(N), and directs the next access to the server with the least number of active connections. Still another strategy is a weighted strategy in which each of servers 20(1)-20(N) are allocated a percentage capacity based on its individual operational capabilities/capacities (i.e., one server may be able to handle twice as many connections as another server), and server load balancer 15 uses this information to direct the next access to one of the servers. Another strategy is a fastest response time strategy in which accesses are directed to the fastest responding server. Yet another strategy is a server-agent strategy in which clients that communicate with server load balancer 15 are installed on each of the servers 20(1)-20(N). Based on information from the clients, server load balancer 15 can choose the server to which subsequent accesses should be directed. As such, to balance the load, sophisticated load balancers may take into account different factors, such as a server's reported load, recent response times, up/down status (determined by a monitoring poll of some kind), number of active connections, geographic location, capabilities, or how much traffic it has recently been assigned, etc.

In certain circumstances, the load resulting from data traffic 41 may exceed the capabilities of servers 20(1)-20(N) such that, because the threshold limits for all of the servers are at their maximum, server load balancer 15 can no longer direct the traffic to a particular one of servers 20(1)-20(N). This server overload may occur, for example, when application 40 is a website hosted by servers 20(1)-20(N). In such situations, the website is designed to handle an average and maximum predetermined amount of data traffic 41 at any one time. If the website becomes popular as a result of advertisements, endorsements, etc., the data traffic 41 may unexpectedly increase so as to exceed the predetermined (designed for) capabilities of servers 20(1)-20(N).

In conventional systems, unexpected increases in data traffic that exceed the planned for capabilities of servers 20(1)-20(N) may result in delays in access to application 40. For example, in certain conventional systems, if the servers 20(1)-20(N) are at their maximum capabilities, a subsequent access from any one of the computers 50(1)-50(N) is delayed until an earlier connection is terminated, thereby freeing up resources. Certain other conventional systems handle increases in data traffic by bringing stand-by servers online. Standby servers are servers that have been previously provisioned by an administrator for subsequent activation, meaning that an administration has previously loaded the servers with the proper operating system (OS), application(s) (e.g., application 40), and the applications have been configured for subsequent use (access). In certain such conventional systems, the administrator may periodically monitor the load on the servers and manually add/remove standby servers manually based on the load. This is unwieldy in data centers hosting large numbers of server farms with fluctuations in load. Alternatively, the standby servers are activated when the load exceeds a predetermined peak load. Prior techniques for provisioning of servers based on the peak load results in poor utilization of the servers under lesser load conditions (i.e., servers are waiting in the standby mode) and results in suboptimal power usage and increased costs.

In the example of FIG. 1A, server load balancer 15 includes dynamic provisioning module 35 that enables the server load balancer to dynamically add/remove servers from server farm 16 for use in processing data traffic 41. More specifically, dynamic provisioning module 35 enables server load balancer 15, with the assistance of resource manager 25, to provision and add additional servers on-demand (i.e., in response to increases in data traffic 41), and to remove servers when data traffic 41 falls. As such, in the example of FIG. 1A, the number of servers used to process data traffic 41 can be automatically increased to include servers that were not already allocated or available (i.e., to include previously unprovisioned servers) without the prior input from, or involvement of, a network administrator or other user. Similarly, the number of servers used to process data traffic 41 can be automatically decreased without prior input from, or involvement of, the administrator.

In operation, as described further below, dynamic provisioning module 35 monitors the load on servers 20(1)-20(N) with respect to one or more predetermined load thresholds. If dynamic provisioning module 35 determines that the load on one or more of servers 20(1)-20(N) exceeds, or is likely to exceed, one or more of the predetermined load thresholds, a request is generated to resource manager 25 that one or more additional servers are desired to process data traffic 41. This request is schematically represented by arrow 60 in FIG. 1A. Further details of such a request are provided below.

In the example of FIG. 1A, computing enterprise 10 comprises private cloud 30 that comprises a plurality of physical or virtual servers 45(1)-45(N). These servers 45(1)-45(N) are not standby servers that have been previously provisioned for use in processing traffic, but rather are, for example, virtual machines that are dynamically created or offline servers (i.e., servers that are powered down) or servers being used for other operations in which capacity is available (e.g., servers that were previously used to host other applications, but which were removed from operation due to decreases in demand). When resource manager 25 receives the request from server load balancer 15 indicating that there is a desire to add a server, resource manager 25 will provision one or more of servers 45(1)-45(N) for use in processing data traffic 41. Resource manager 25 provisions one or more servers 45(1)-45(N) by automatically installing an operating system (OS) on one or more of the servers, automatically installing application 40 on the one or more servers, and automatically configuring application 40 on the one or more of the servers for access by computers 50(1)-50(N). In the example of FIG. 1A, server 45(1) is provisioned for use in processing data traffic 41, and the provisioning operations are schematically illustrated by arrow 65. Further details of resource manager 25 are provided below.

In certain circumstances, a notification may be generated and sent by server 45(1) or resource manager 25 to server load balancer 15 indicating that server 45(1) is provisioned and ready for use in processing data traffic 41. In the example of FIG. 1A, this notification is generated by server 45(1) and is schematically illustrated by arrow 70. Notification 70 may include the Internet Protocol (IP) address for server 45(1) so that server load balancer 15 is aware of the address to use in forwarding future data traffic.

After server 45(1) is provisioned for use in processing data traffic 41, server 45(1) is included in the server farm. As such, server load balancer 15 is configured to balance the load resulting from data traffic 41 between servers 20(1)-20(N), and server 45(1) in accordance with any of the balancing strategies described above and/or any load balancing strategies now known or later developed.

As noted above, dynamic provisioning module 35 monitors the load on servers 20(1)-20(N) resulting from data traffic 41 to determine if the addition of one or more servers is desired. Dynamic provisioning module 35 is also configured to monitor the load to determine if servers may be removed from use in processing data traffic 41. More specifically, the load on servers 20(1)-20(N), and any additional servers in use, is monitored with respect to one or more minimum load thresholds. If the load of at least one of the servers falls below these minimum thresholds, one or more servers may be removed from use (retired) in processing data traffic 41.

Retiring a server, referred to as a retiring server, involves several steps. First, server load balancer 15 removes the retiring server from the server farm and stops assigning new connections/requests to the retiring server. Next, server load balancer 15 waits for the current connections/requests handled by the retiring server to terminate. Once all the connections to the retiring server have terminated, server load balancer 15 sends a request to resource manager 25 to disable/power-off the retiring server. Server load balancer 15 will hold the retiring server in the disabled state for some time (hold time) without removing the retiring server so that, if an immediate load fluctuation necessitates use of the retiring server, the server load balancer can enable/power-on the retiring server and avoid creating a new server. After the hold time, server load balancer 15 will request that resource manager 25 free the resources used by the retiring server.

Server load balancer 15 may be implemented in hardware, software, or a combination of hardware and software, and may be a stand-alone network device or implemented as an element of another network device. For example, in one arrangement, server load balancer 15 is part of a router.

In summary, server load balancer 15 is configured to monitor the load on servers 20(1)-20(N) in server farm 16, and is configured to determine when additional servers are desired, or when some servers may be retired. Server load balancer 15 operates with resource manager 25 that, in response to requests from the load balancer, can provision servers on demand.

In the example of FIG. 1A, resource manager 25 is a server further configured to manage the infrastructure of private cloud 30 (i.e., control resource allocation in the cloud).

FIG. 1B is a block diagram of another arrangement of computing enterprise 10. Similar to the arrangement of FIG. 1A, enterprise 10 comprises server load balancer 15, server farm 16 containing servers 20(1)-20(N), and resource manager 25. However, enterprise 10 of FIG. 1B does not include a private cloud from which additional servers may be added. Rather, in FIG. 1B, resource manager 25 is configured to provision one or more servers 85(1)-85(N) from public cloud 80.

More specifically, dynamic provisioning module 35 in server load balancer 15 monitors data traffic 41 resulting from access to application 40 hosted on servers 20(1)-20(N). If the load on one or more servers 20(1)-20(N) exceeds, or is likely to exceed, a predetermined threshold, a request is generated to resource manager 25 that one or more additional servers are desired to process data traffic 41. This request is schematically represented by arrow 90 in FIG. 1B.

As noted above, in the example of FIG. 1A, computing enterprise 10 cooperates with public cloud 80 that comprises a plurality of physical or virtual servers 85(1)-85(N). These servers 85(1)-85(N) are not standby servers that have been previously provisioned for use in processing traffic, but rather are, for example, virtual machines that are dynamically created or offline servers (i.e., servers that are powered down), servers being used for other operations, or generic backup servers that the public cloud provider makes available to computing enterprises. When resource manager 25 receives the request from server load balancer 15 indicating that there is a desire to add a server, resource manager 25 will provision one or more of servers 85(1)-85(N) for use in processing data traffic 41. Resource manager 25 provisions one or more servers 85(1)-85(N) by automatically installing an operating system (OS) on the one or more of servers, automatically installing application 40 on the one or more of the servers, and automatically configuring application 40 on the one or more of the servers for access by computers 50(1)-50(N). In the example of FIG. 1B, server 85(1) is provisioned for use in processing data traffic 41, and the provisioning operations are schematically illustrated by arrow 95. Resource manager 25 is a server configured to perform the provisioning operations and to manage communications with public cloud 80.

In the example of FIG. 1B, resource manager 25 is a server further configured to manage the infrastructure of public cloud 80 (i.e., control resource allocation in the cloud).

In certain circumstances, a notification message may be generated and sent by server 85(1) or resource manager 25 to server load balancer 15 indicating that server 85(1) is provisioned and ready for use in processing data traffic 41. In the example of FIG. 1B, this notification message is generated by server 85(1) and is schematically illustrated by arrow 100.

After server 85(1) is provisioned for use in processing data traffic 41, server load balancer 15 may direct the traffic to server 85(1). As such, server load balancer 15 is configured to balance the load resulting from data traffic 41 between servers 20(1)-20(N), and server 85(1) in accordance with any of the balancing strategies described above and/or any other load balancing strategies now known or later developed.

As noted above, dynamic provisioning module 35 monitors the load on servers 20(1)-20(N) resulting from data traffic 41 to determine if the addition of one or more servers is desired. Dynamic provisioning module 35 is also configured to monitor the load to determine if servers may be removed from use in processing data traffic 41. More specifically, the load on servers 20(1)-20(N), and any additional servers in use, is monitored with respect to one or minimum load thresholds. If the load one at least one of the servers falls below these minimum thresholds, one or more servers may be removed from use (retired) in processing data traffic 41.

Figure 1C:
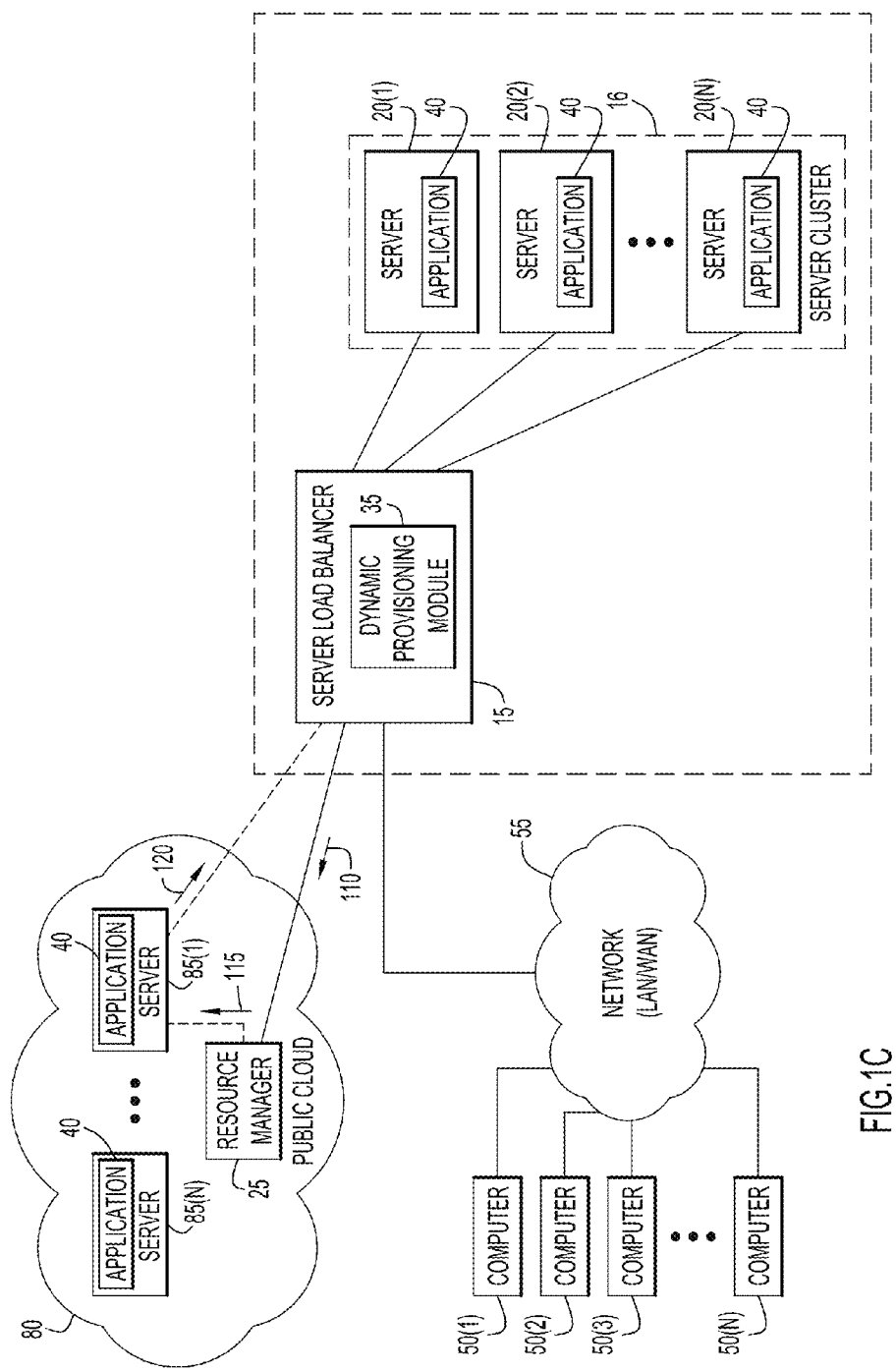
FIG. 1C is a block diagram of still another example computing enterprise having a server load balancer operating with an external resource manager for on-demand addition/removal of servers to/from a server farm.

FIG. 1C is a block diagram of yet another arrangement of computing enterprise 10. Similar to the arrangement of FIG. 1A, enterprise 10 comprises server load balancer 15 and server farm 16 comprising servers 20(1)-20(N). However, enterprise 10 of FIG. 1C does not include resource manager 25 or a private cloud from which additional servers may be added. Rather, in FIG. 1C, resource manager 25 is disposed in public cloud 80, and is configured to provision one or more servers 85(1)-85(N) from the public cloud for use in processing data traffic 41.

More specifically, dynamic provisioning module 35 in server load balancer 15 monitors data traffic 41 resulting from access to application 40 hosted on servers 20(1)-20(N). If the load on one or more servers 20(1)-20(N) exceeds, or is likely to exceed, a predetermined threshold, a request is generated to resource manager 25 that one or more additional servers are desired to process data traffic 41. This request is schematically represented by arrow 110 in FIG. 1C.

In the example of FIG. 1C, computing enterprise 10 cooperates with public cloud 80 that comprises a plurality of servers 85(1)-85(N). These servers 85(1)-85(N) are not standby servers that have been previously provisioned for use in processing traffic, but rather are, for example, virtual machines that are dynamically created or offline servers (i.e., servers that are powered down), servers being used for other operations, or generic backup servers that the public cloud provider makes available to computing enterprises. When resource manager 25 receives the request from server load balancer 15 indicating that there is a desire to add a server, resource manager 25 will provision one or more of servers 85(1)-85(N) for use in processing data traffic 41. As detailed further below, resource manager 25 provisions one or more servers 85(1)-85(N) by automatically installing an operating system (OS) on the one or more of servers, automatically installing application 40 on the one or more of the servers, and automatically configuring application 40 on the one or more of the servers for access by computers 50(1)-50(N). In the example of FIG. 1C, server 85(1) is provisioned for use in processing data traffic 41, and the provisioning operations are schematically illustrated by arrow 115. Resource manager 25 is a server configured to perform the provisioning operations and to manage the infrastructure of public cloud 80.

In certain circumstances, a notification message may be generated and sent by server 85(1) or resource manager 25 to server load balancer 15 indicating that server 85(1) is provisioned and ready for use in processing data traffic 41. In the example of FIG. 1C, this notification message is generated by server 85(1) and is schematically illustrated by arrow 120.

After server 85(1) is provisioned for use in processing data traffic 41, server load balancer 15 may direct the traffic to server 85(1). As such, server load balancer 15 is configured to balance the load resulting from data traffic 41 between servers 20(1)-20(N), and server 85(1) in accordance with any of the balancing strategies described above and/or any load balancing strategies now known or later developed.

As noted above, dynamic provisioning module 35 monitors the load on servers 20(1)-20(N) resulting from data traffic 41 to determine if the addition of one or more servers is desired. Dynamic provisioning module 35 is also configured to monitor the load to determine if servers may be removed from use in processing data traffic 41. More specifically, the load on servers 20(1)-20(N), and any additional servers in use, is monitored with respect to one or minimum load thresholds. If the load one at least one of the servers falls below these minimum thresholds, one or more servers may be removed from use (retired) in processing data traffic 41.

Figure 2A:
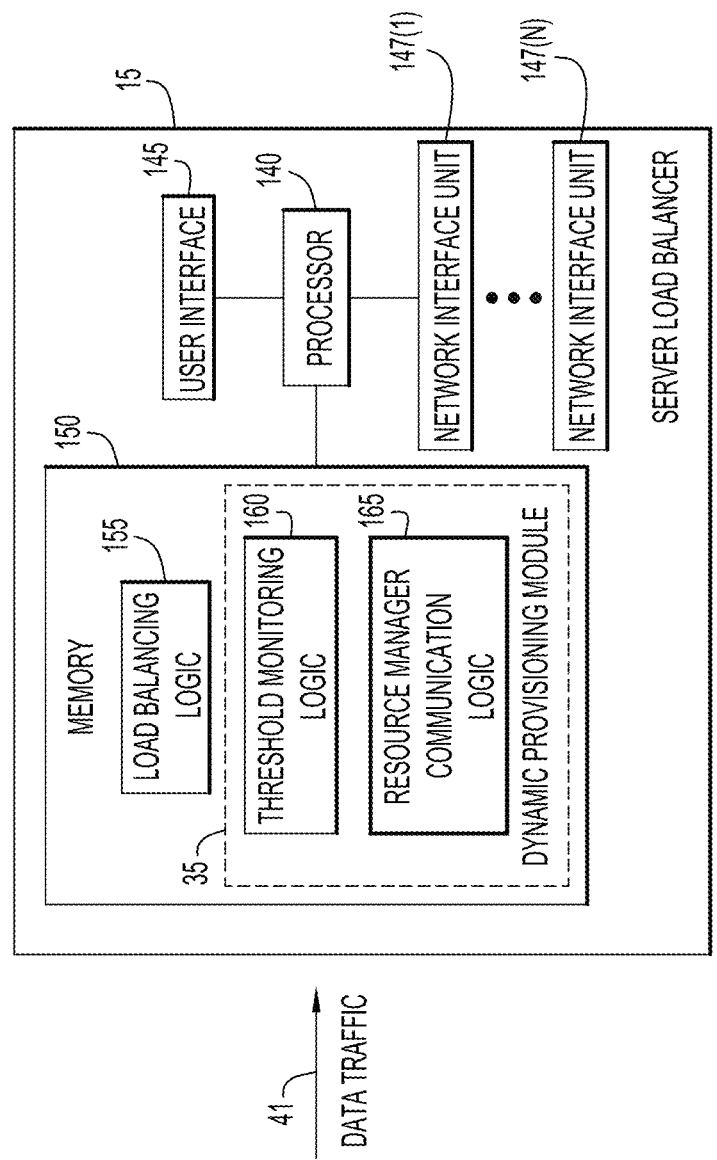
FIG. 2A is a block diagram of one example of the server load balancer configured to cooperate with a resource manager for on-demand addition/removal of servers.

FIG. 2A is a block diagram of one example of server load balancer 15 configured to cooperate with resource manager 25 for on-demand addition/removal of servers from server farm 16. As shown, load balancer 15 comprises a processor 140, a user interface 145, a plurality of network interface units 147(1)-147(N) and memory 150. Memory 150 comprises load balancing logic 155, threshold monitoring logic 160, and resource manager communication logic 165. Threshold monitoring logic 160 and resource manager communication logic 165 are part of dynamic provisioning module 35. The network interface units 147 enable communication over a network (local or wide area) and are, for example, Ethernet cards. The user interface is, for example, a command processor interface that be accessed remotely using protocols (e.g., TELNET or Secure Shell (SSH)), a display screen or a port that connects to a display screen, and/or a module or port for connection to a module, that receives user inputs (e.g., keyboard, or a port that connects to a keyboard).

As noted above, server load balancer 15 is configured to balance data traffic 41 between servers 20(1)-20(N) (not shown in FIG. 2A) in accordance with one or more load balancing strategies (e.g., round robin, least number of connections, weighted, etc.). These load balancing strategies are enabled by load balancing logic 155. That is, load balancing logic 155 comprises one or more software processes that, when executed by processor 140, balance the load resulting from data traffic 41 between servers 20(1)-20(N). As such, FIG. 2A illustrates software-based load balancing. It is to be appreciated that, in an alternative arrangement, hardware-based load balancing may be implemented.

As noted above, dynamic provisioning module 35 is configured to monitor the load on servers 20(1)-20(N) and, in response to the load, cooperate with resource manager 25 to add or remove servers to process the data traffic 41. The monitoring operations of dynamic provisioning module 35 are enabled by threshold monitoring logic 160. That is, threshold monitoring logic 160, when executed by processor 140, monitors the load on one or more servers 20(1)-20(N). In certain circumstances, the load on servers 20(1)-20(N) is monitored with respect to one or more predetermined thresholds.

Dynamic provisioning module 35 may perform the monitoring and addition/removal of servers according to one or more predetermined definitions set, for example, by an administrator or other user. In one example, the administrator may define the server profile containing the configurations to be applied to servers 20(1)-20(N), (e.g., probe(s), maximum connections, minimum number of servers to be maintained based on, for example, likely demands to the hosted application, etc.). The administrator may also define the maximum number of servers that can be allocated to, and managed by, server load balancer 15, and/or the details of resource manager 25 (i.e., the application program interface (API) utilized by the resource manager) or the templates supported by the resource manager for provisioning additional servers, etc. The administrator may also define the one or more thresholds used by threshold monitoring logic 160 to determine when one or more servers should be added, or removed, from use in processing data traffic 41. These and/or other definitions may be set by an administrator or other user via, for example, user interface 145. Alternatively, a command line interface (CLI) may be provided to enable setting of the desired definitions.

A number of different thresholds may be used by threshold monitoring logic 160 to determine if one or more servers should be added, or removed, from use in processing data traffic 41. In one example, the utilized threshold for determining if one or more servers should be added is set at a percentage of the maximum connections configured for the servers 20(1)-20(N). In such an example, the server load balancer may balance among the available servers until this percentage is reached on one or more of the servers 20(1)-20(N). Once the threshold is reached, or is likely to be reached, dynamic provisioning module 35 generates the request to resource manager 25 for the addition of servers. Other thresholds that may be used include, but are not limited to a percentage of maximum volume of data traffic, percentage of maximum CPU, or percentage of and memory usage of the servers, beyond which the performance will deteriorate. Since the data traffic to/from the servers flows through the server load balancer 15, the server load balancer can monitor the traffic without any additional instrumentation. To set thresholds on CPU and memory utilization of the servers, server load balancer 15 is configured to periodically collect statistics from the relevant servers.

In one optional technique, the level of the utilized threshold may be chosen to account for the time that is needed to add a server so that the added server is ready at the time the need arises. That is, the threshold is selected so that the additional server is added before the current servers reach their maximum load. Additionally, based on, for example, the rate of increase in load, dynamic provisioning module 35 can heuristically determine when one or more additional servers may be desired and, accordingly, request that resource manager 25 provision the desired servers to meet the predicted load.

As noted above, dynamic provisioning module 35 sends a request to resource manager 25 for the provisioning of one or more additional servers. More specifically, this request is generated by processor 140 through the execution of resource manager communication logic 165. That is, resource manager communication logic 165, when executed by processor 140, generates the request(s) to resource manager 25 for the provisioning of one or additional servers and/or the removal of one or more servers. In certain circumstances, resource manager 25 may generate notification to server load balancer 15 to indicate completion of provisioning of requested servers.

As noted above, resource manager 25 is any server or other device having the ability to provision servers (i.e., load an OS, load an application, and configure the application) in response to a received requests. As a number of different such devices may be utilized, a number of different interfaces (i.e., APIs) for communication with server load balancer 15 may be provided. As such, resource manager communication logic 165 may enable server load balancer 15 to communicate with a number of different types of interfaces using a number of different communication protocols. That is, resource manager communication logic 165 includes logic that allows server load balancer 15 to integrate with a number of different types of servers that perform resource management operations. In certain circumstances, the communications between server load balancer 15 and resource manager 25 may be secured using, for example, Secure Sockets Layer (SSL) or other Transport Layer Security (TSL) features.

In operation, resource manager 25 may provision one or more additional servers in accordance with a predefined template. These predefined templates may be maintained by resource manager 25 and be specific to the resource manager. As such, and the request from server load balancer 15 may specify the template (through some predetermined identifier) that should be used by the resource manager to provision additional servers.

In one example, Open Virtualization Format (OVF) is used by a resource manager 25 to provision one or more additional servers. OVF defines a standard way to package and distribute virtual machines. OVF provides complete specification of the virtual machine including the desired virtual disks and desired virtual hardware configurations (central processing unit (CPU), memory, networking, etc.). Administrators can create one or more virtual disk images with the desired OS and application installed thereon. An OVF package can then be created with these virtual disk images along with the desired virtual machine hardware configuration and application configuration. This OVF package can then be used to quickly provision servers as virtual machines into virtual infrastructure with no manual intervention. The application configuration (for e.g. IP address of the server) in the OVF package can be dynamically updated for every server instance before being provisioned.

In certain circumstances, when resource manager 25 provisions servers for use in processing data traffic 41, the resource manager can assign a cost or weight to the added server. This cost is a representation of how much the server costs the computing enterprise to maintain and use the server for processing the data traffic. This cost may be depend on, for example, whether the server has been provisioned in an internal cloud (i.e., private cloud 30 of FIG. 1A) or an external cloud (i.e., public cloud 80 of FIG. 1B), type of server (physical or virtual), or other factors. In the case of cloud environments, in addition to the type of cloud (private/public) the cost can be assigned based on the service provider and type of server instance created. For example, certain cloud providers support three different types of servers: (1) on-demand, (2) reserved, and (3) spot, and the cost may vary depending on the type of server used. As such, the cost of a server instance on a cloud will vary for each provider and type of service/server.

As noted above, when a determination is made that the load on the utilized servers falls below a predetermined threshold, server load balancer 15 may consolidate the processing of data traffic 41 to a few number of servers. In certain arrangements, the selection of which servers to retire is based on the relative costs of the servers. That is, server load balancer 150 may instruct resource manager 25 to remove the highest cost servers first in an effort to decrease operating costs.

Figure 2B:
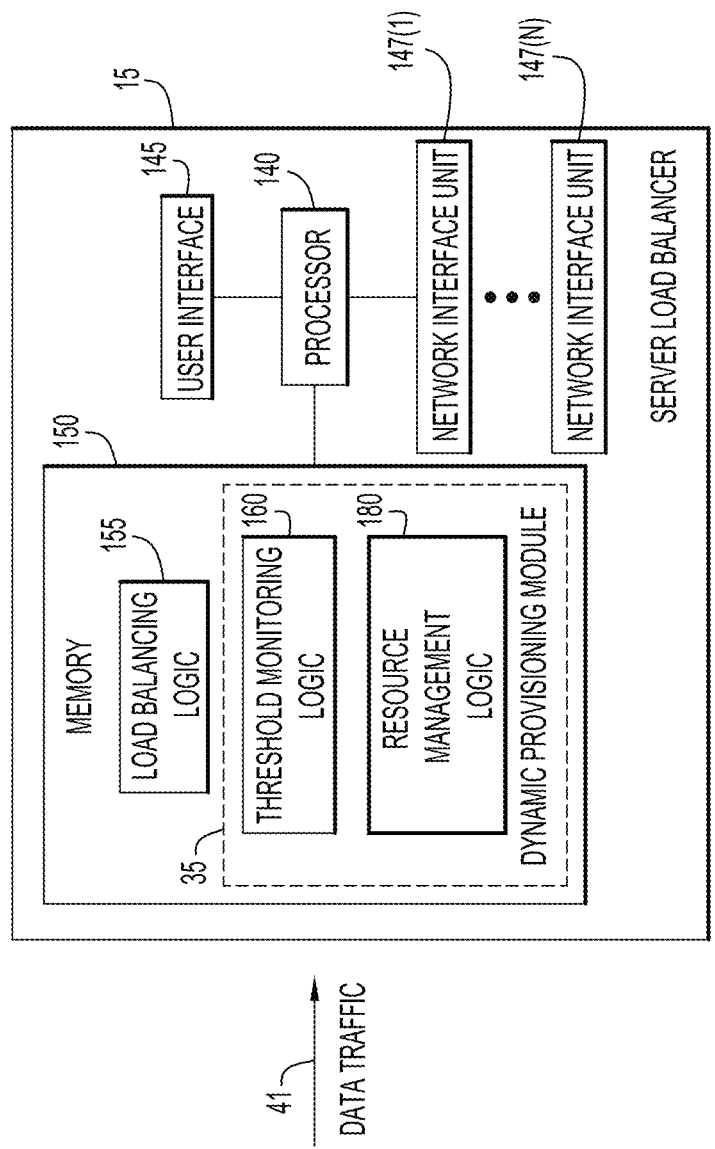
FIG. 2B is a block diagram of one example of the server load balancer configured to perform resource management operations enabling on-demand addition/removal of servers.

FIG. 2B is a block diagram of another example of server load balancer 15. Similar to the example of FIG. 2A, server load balancer 15 of FIG. 2B comprises processor 140, user interface 145, a plurality of network interface units 147(1)-147(N) and memory 150. Memory 150 comprises load balancing logic 155, threshold monitoring logic 160, and resource management logic 180. In this example, threshold monitoring logic 160 and resource manager management logic 180 are part of dynamic provisioning module 35.

As noted above, server load balancer 15 is configured to balance data traffic 41 between servers 20(1)-20(N) (not shown in FIG. 2B) in accordance with one or more load balancing strategies (e.g., round robin, least number of connections, weighted, etc.). These load balancing strategies are enabled by load balancing logic 155. Also as noted above, dynamic provisioning module 35 is configured to monitor the load on servers 20(1)-20(N) with respect to one or more predetermined thresholds through the execution of threshold monitoring logic 160.

In the above described examples (FIGS. 1A, 1B, 1C and 2A), dynamic provisioning module 35 performs the noted monitoring operations and cooperates with an external server (resource manager) to add or remove servers. In the example of FIG. 2B, the operations of the resource manager are enabled on server load balancer 15 through the execution of resource management logic 180. More specifically, resource management logic 180 provides the ability to dynamically provision one or more additional servers in response to load demands detected by threshold monitoring logic 160. As noted above, this provisioning enabled by resource management logic 180 includes installing an operating system (OS) on the one or more additional servers, installing the desired application (e.g., application 40), and configuring the application for access.

As noted above with reference to FIG. 2A, user interface allows an administrator or other user to set definitions for the operation of, for example, threshold monitoring logic 160 and/or resource communication logic 165. In the example of FIG. 2B, an administrator may also set definitions controlling the operation of resource management logic 180. For example, with reference to resource management logic 180, the administrator may define the provisioning details, including the OS to be loaded on additional servers, the application, how the application is to be configured for operation, templates for using in provisioning the servers, how to retire servers, etc.

In the example of FIG. 2A, memory 150 comprises load balancing logic 155, threshold monitoring logic 160, and resource communication logic 165. In the example of FIG. 2B, memory 150 comprises load balancing logic 155, threshold monitoring logic 160, and resource management logic 180. In both FIGS. 2A and 2B, memory 150 may comprise read only memory (ROM), random access memory (RAM), magnetic disk storage media devices, optical storage media devices, flash memory devices, electrical, optical, or other physical/tangible memory storage devices. The processor 140 is, for example, a microprocessor or microcontroller that executes instructions for the load balancing logic 155, threshold monitoring logic 160, resource communication logic 165, and/or resource management logic 180 stored in memory 150. Thus, in general, the memory 150 may comprise one or more computer readable storage media (e.g., a memory device) encoded with software comprising computer executable instructions and when the software is executed (by the processor 140) it is operable to perform the operations described herein in connection with load balancing logic 155, threshold monitoring logic 160, resource communication logic 165, and/or resource management logic 180.

Figure 3:
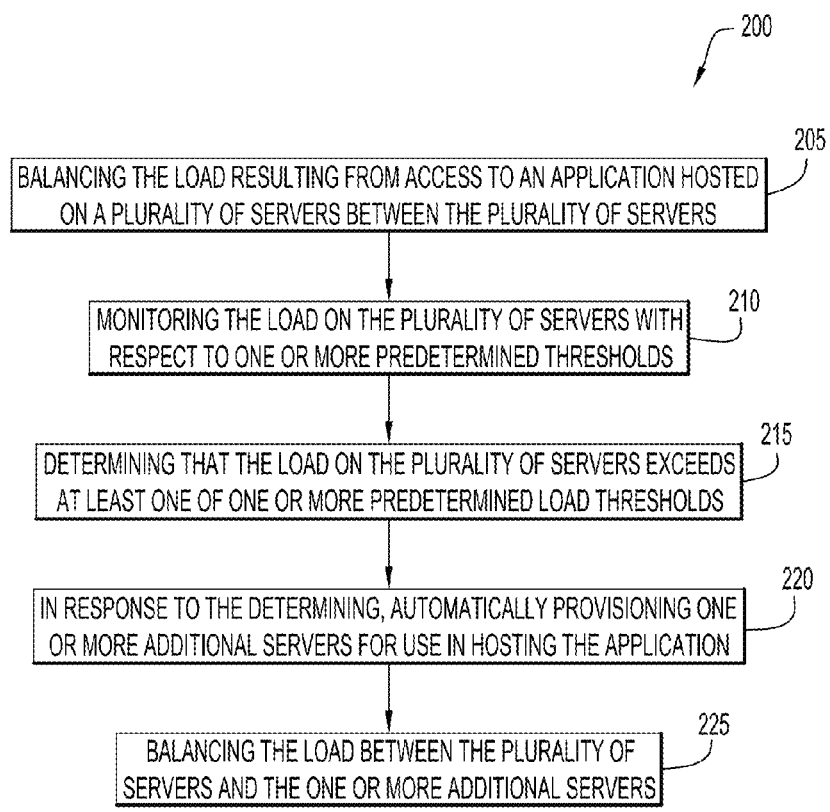
FIG. 3 is a high-level flowchart illustrating an example method for the addition of servers in response to load balancing demands.

FIG. 3 is a high-level flowchart illustrating an example method 200 for the addition of one or more servers in response to load balancing demands. Method 200 begins at 205 where a load, resulting from traffic associated with an application hosted on a plurality of servers, is balanced between the servers. At 210, the load on the plurality of servers is monitored with respect to one or more predetermined thresholds and, at 215, a determination is made that the load on at least one of the plurality of servers exceeds one of the one or more predetermined thresholds. In response to this determination, at 220 one or more additional servers are automatically provisioned for use in hosting the application. At 225, the load is balanced between the plurality of servers and the one or more additional servers.

Figure 4:
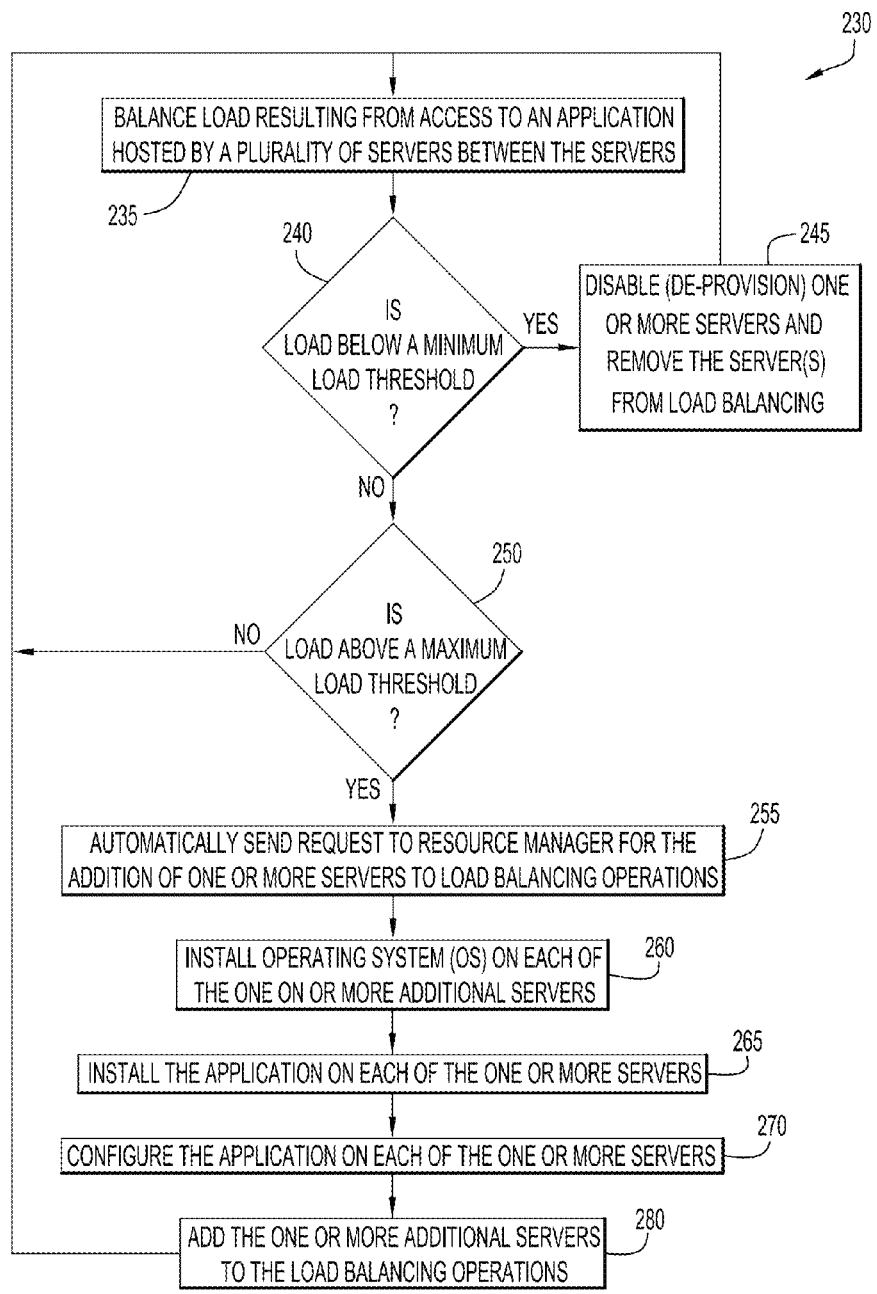
FIG. 4 is a detailed flowchart illustrating an example method of operation of the server load balancer for on-demand addition/removal of servers.

FIG. 4 is a detailed flowchart illustrating an example method 230 for the operation of a server load balancer in accordance with techniques described herein. Merely for ease of illustration, method 230 will described with reference to the example of FIG. 1A.

As noted above, instances of application 40 are hosted on a plurality of servers 20(1)-20(N), and application 40 is accessed by one or more computers 50(1)-50(N). This results in data traffic 41 that places a load on the servers 20(1)-20(N). Method 230 starts at 235 where the load resulting from data traffic 41 (i.e., resulting from the access to application 40) is balanced between servers 20(1)-20(N). At 240, the load on servers 20(1)-20(N) is monitored with respect to one or more predetermined minimum load thresholds. As noted above, these minimum load thresholds are thresholds below which the servers have significant extra capacity (i.e., the servers are underutilized). If it is determined that the load on one or more of servers 20(1)-20(N) falls below at least one of the minimum load thresholds, server load balancer 15 can start consolidating the traffic to fewer servers. As such, method 240 proceeds to 245 where one or more servers are disabled (i.e., de-provisioned). The one or more servers may be disabled immediately or after an idle timeout. After the server is disabled, method 230 returns to 235 for balancing the load from data traffic 41 between the remaining servers.

If, at 240, it is determined that the load is above the one or more minimum thresholds, method 230 proceeds to 250 where a determination is made as to whether the load on servers 20(1)-20(N) is above one or more maximum load thresholds. If the load is below the one or more thresholds, method 230 returns to 235 for balancing the load from data traffic 41 between the servers. However, if the load on one or more of servers 20(1)-20(N) is above at least one of the more thresholds, server load balancer 15 determines that one or more additional servers are desired to process data traffic 41. As such, at 255, server load balancer 255 automatically sends a request to resource manager 25 for the addition of the servers. Details of such a request are described above.

In response to the request from server load balancer 15, at 260, resource manager 25 automatically installs an OS one each of the servers to be added. At 265, resource manager 25 automatically installs application 40 on each of the servers to be added, and, at 270, application 40 is configured on each of the servers to be added. The operations of 260, 265 and 270 are collectively referred to as provisioning of the one or more servers to be added.

After the one or more additional servers are provisioned, the one or more additional servers are added to the load balancing operations at 280. Method 230 then returns to 235 where the load resulting from data traffic 41 is balanced between servers 20(1)-20(N) and the one or more additional servers.

As noted above, techniques described herein allow the addition/removal of servers to/from a server farm in response to monitor load demands. That is, servers may be added/removed on-demand. Such techniques may provide several advantages. For example, the automatic addition/removal of servers enables data center administrators to leverage the elasticity offered by cloud environments. In addition to enabling optimal use of available resources, the techniques may also help reduce the operation/maintenance cost because standby servers are not used. Additionally, the techniques described herein may be easily deployed and easily integrated with existing cloud infrastructures. Furthermore, by provisioning, for example, virtual machines to match the load, resources may be left free for allocation to other workloads, virtual machines may be consolidated to fewer physical servers, and power usage may be decreased.

The techniques for dynamically adding/removing servers have been primarily described herein with reference to hardware or software load balancers. It is to be appreciated that such load balancers may operate at different layers (e.g., Layer 4 or Layer 7), and the techniques described herein may implemented in any server load balancer configuration. Additionally, the techniques described herein may be implemented in more advanced devices, such as an Application Delivery Controller (ADC). An ADC is an advanced load balancer that provides features to improve capacity while increasing system performance. ADCs offer feature sets that may include, for example, advanced load balancing strategies, content caching, content compression, connection management, connection Pooling, SSL, advanced routing, configurable server health monitoring and content manipulation.

The above description is intended by way of example only.

What is claimed is:

1. A method comprising:
    balancing, among a plurality of servers, a load resulting from processing of traffic associated with an application hosted on the plurality of servers;
    monitoring the load on the plurality of servers that results from the processing of the traffic associated with the application hosted on the plurality of servers;
    determining that the load on the plurality of servers has caused a number of connections to at least one of the plurality of servers to exceed a predetermined load threshold indicative of a predetermined percentage of a maximum number of connections supported by the at least one of the plurality of servers, wherein the predetermined load threshold is chosen to account for a time needed to add an additional server so that the added server is ready when needed;
    automatically provisioning one or more additional servers for use in hosting the application in response to determining that the load on the plurality of servers exceeds the predetermined load threshold;
    assigning a cost to each of the plurality of servers and one or more additional servers that varies depending on whether the server is a reserved server or an on-demand server;
    balancing the load resulting from the traffic associated with the application between the plurality of servers and the one or more additional servers;
    determining that the load on the plurality of servers and the one or more additional servers is below the predetermined load threshold; and
    in response to determining that the load is below the predetermined load threshold, automatically disabling at least one of the plurality of servers or one of the one or more additional servers based on the assigned costs such that higher cost servers are disabled first.

2. The method of claim 1, wherein automatically provisioning one or more additional servers comprises:
    automatically installing an operating system on the one or more additional servers;
    automatically installing the application on the one or more additional servers; and
    automatically configuring the application on the one or more additional servers for processing the traffic associated with the application.

3. The method of claim 1, wherein automatically provisioning one or more additional servers comprises:

generating a request from a load balancer to a resource manager to provision the one or more additional servers for use in hosting the application.

4. The method of claim 3, further comprising:
generating a request that identifies a template for use by the resource manager in provisioning the one or more additional servers.

5. The method of claim 1, wherein the assigning a cost includes assigning a cost to each server that varies further depending on whether the type of server is a reserved server, an on-demand server, or a spot server.

6. One or more non-transitory computer readable storage media encoded with software comprising computer executable instructions and when the software is executed at a load balancer it is operable to:
balance, among a plurality of servers, a load resulting from processing of traffic associated with an application hosted on the plurality of servers;
monitor the load on the plurality of servers that results from the processing of the traffic associated with the application hosted on the plurality of servers;
determine that the load on the plurality of servers has caused a number of connections to at least one of the plurality of servers to exceed a predetermined load threshold indicative of a predetermined percentage of a maximum number of connections supported by the at least one of the plurality of servers, wherein the predetermined load threshold is chosen to account for a time needed to add an additional server so that the added server is ready when needed;
automatically provision one or more additional servers for use in hosting the application in response to a determination that the load exceeds a predetermined load threshold;
assign a cost to each of the plurality of servers and one or more additional servers that varies depending on whether the server is a reserved server or an on-demand server;
balance the load resulting from the traffic associated with the application between the plurality of servers and the one or more additional servers;
determine that the load on the plurality of servers and the one or more additional servers is below the predetermined load threshold; and
in response to determining that the load is below the predetermined load threshold, automatically disable at least one of the plurality of servers or one of the one or more additional servers based on the assigned costs such that higher cost servers are disabled first.

7. The non-transitory computer readable media of claim 6, wherein the instructions operable to automatically provision one or more additional servers comprise instructions operable to:
automatically install an operating system on the one or more additional servers;
automatically install the application on the one or more additional servers; and
automatically configure the application on the one or more additional servers for processing the traffic associated with the application.

8. The non-transitory computer readable media of claim 6, wherein the instructions operable to automatically provision one or more additional servers comprise instructions operable to:
generate a request from the load balancer to a resource manager to provision the one or more additional servers for use in hosting the application.

9. The non-transitory computer readable media of claim 8, further comprising instructions operable to:
generate a request that identifies a template for use by the resource manager in provisioning the one or more additional servers.

10. The computer readable medium of claim 6, wherein instructions to assign a cost include instructions to assign a cost to each server that varies further depending on whether the type of server is a reserved server, an on-demand server, or a spot server.

11. An apparatus comprising:
a plurality of network interfaces configured to receive and forward data traffic;
a memory; and
a processor configured to:
balance, among a plurality of servers, a load resulting from processing of traffic associated with an application hosted on the plurality of servers, monitor the load on the plurality of servers,
determine that the load on the plurality of servers has caused a number of connections to at least one of the plurality of servers to exceed a predetermined load threshold indicative of a predetermined percentage of a maximum number of connections supported by the at least one of the plurality of servers,
automatically provision one or more additional servers for use in hosting the application in response to determining that the load on the plurality of servers exceeds a predetermined load threshold, wherein the predetermined load threshold is chosen to account for a time needed to add an additional server so that the added server is ready when needed,
assign a cost to each of the plurality of servers and one or more additional servers that varies depending on whether the server is a reserved server or an on-demand server,
balance the load resulting from the traffic associated with the application between the plurality of servers and the one or more additional servers,
determine that the load on the plurality of servers and the one or more additional servers is below the predetermined load threshold, and
in response to determining that the load is below the predetermined load threshold, automatically disable at least one of the plurality of servers or one of the one or more additional servers based on the assigned costs such that higher cost servers are disabled first.

12. The apparatus of claim 11, wherein to automatically provision one or more additional servers, the processor is configured to automatically install an operating system on the one or more additional servers, automatically install the application on the one or more additional servers, and automatically configure the application on the one or more additional servers for processing the data traffic.

13. The apparatus of claim 11, wherein to automatically provision one or more additional servers, the processor is configured generate a request to a resource manager to provision the one or more additional servers for use in hosting the application.

14. The apparatus of claim 13, wherein the processor is further configured to generate a request that identifies a template for use by the resource manager in provisioning the one or more additional servers.

15. The apparatus of claim 11, wherein the processor is configured to assign to each server that varies further depending on whether the type of server is a reserved server, an on-demand server, or a spot server.

* * * * *